US008527490B2

(12) United States Patent
Wessling et al.

(10) Patent No.: US 8,527,490 B2
(45) Date of Patent: *Sep. 3, 2013

(54) STRUCTURING AND SEARCHING DATA IN A HIERARCHICAL CONFIDENCE-BASED CONFIGURATION

(75) Inventors: Jens Nicholas Wessling, Ann Arbor, MI (US); Robert Dennis Kahlbaum, Ypsilanti, MI (US); Dustin James Williams, Dexter, MI (US)

(73) Assignee: Rovi Technologies Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/479,207

(22) Filed: May 23, 2012

(65) Prior Publication Data

US 2012/0239696 A1 Sep. 20, 2012

Related U.S. Application Data

(63) Continuation of application No. 12/321,997, filed on Jan. 28, 2009, now Pat. No. 8,209,313.

(51) Int. Cl.
*G06F 17/30* (2006.01)
(52) U.S. Cl.
USPC .......................................... 707/706
(58) Field of Classification Search
USPC .............................. 707/706, 748
See application file for complete search history.

(56) References Cited

U.S. PATENT DOCUMENTS

| 6,785,810 | B1 * | 8/2004 | Lirov et al. ............... 713/165 |
| 7,139,745 | B2 * | 11/2006 | Nakamura et al. ............. 1/1 |
| 7,277,766 | B1 | 10/2007 | Khan et al. |
| 7,359,900 | B2 | 4/2008 | Bogdanov |
| 7,451,078 | B2 | 11/2008 | Bogdanov |
| 7,457,814 | B2 | 11/2008 | Wydroug et al. |
| 7,509,578 | B2 * | 3/2009 | Rujan et al. ............... 715/273 |
| 7,802,308 | B2 | 9/2010 | Kellerman et al. |
| 7,912,852 | B1 * | 3/2011 | McElroy ............... 707/769 |
| 2002/0073072 | A1 | 6/2002 | Fukumoto |
| 2004/0128355 | A1 * | 7/2004 | Chao et al. ............... 709/206 |
| 2007/0288478 | A1 | 12/2007 | DiMaria et al. |
| 2008/0183656 | A1 * | 7/2008 | Perng et al. ............... 707/2 |

FOREIGN PATENT DOCUMENTS

| JP | 5205063 A | 8/1993 |
| JP | 6337899 A | 12/1994 |
| JP | 2001109767 A | 4/2001 |

OTHER PUBLICATIONS

PCT International Search Report, dated Sep. 3, 2010 in corresponding International Application No. PCT/US2010/022126.

(Continued)

*Primary Examiner* — Robert Beausoliel, Jr.
*Assistant Examiner* — Noosha Arjomandi
(74) *Attorney, Agent, or Firm* — Inventive Patent Law P.C.; Jim H. Salter

(57) ABSTRACT

Data searching performed by a server system. A query is received to search data stored in an organizing system in which data has been organized from a highest confidence quality tier to a lowest confidence quality tier. Data of the highest confidence quality tier of the organizing system is searched to satisfy the query, wherein searching the data of the highest confidence quality tier is performed before searching data of a lower confidence quality tier of the organizing system.

10 Claims, 6 Drawing Sheets

(56) References Cited

OTHER PUBLICATIONS

Written Opinion of the International Searching authority dated Sep. 3, 2010 in corresponding PCT Application No. PCT/US2010/022126.

International Preliminary Report on Patentability dated Aug. 11, 2011 in corresponding PCT Application No. PCT/US2010/022126.

* cited by examiner

STRUCTURING AND SEARCHING DATA IN A HIERARCHICAL CONFIDENCE-BASED CONFIGURATION

CROSS REFERENCE TO RELATED APPLICATIONS

This application is a continuation of U.S. application Ser. No. 12/321,997, filed Jan. 28, 2009 (now pending), the entire contents of which are incorporated by reference herein.

FIELD

The present disclosure relates to structuring data on a server system and/or database system. More particularly, the present disclosure relates to structuring and searching data in a hierarchical confidence-based configuration.

BACKGROUND

Searching data of a server is an operation that a client computer may initiate over a network, such as the Internet. Data is organized in some manner in the server to which the client computer sends a query. The advent of digital media (e.g., audio, video and metadata) has caused the sheer size of data to become enormous. When a client computer queries a server, the server may have to search through an enormous amount of data to provide a result for the query. Conventional methods of retrieving data are decreasing in efficiency because methods of searching data sets are not evolving as quickly as the data sets are getting bigger.

SUMMARY

In conventional servers, data may range from high confidence quality data to low confidence quality data. High confidence quality data is data that is entered with a relatively high amount of known care and known control. Low confidence quality data is data that is entered with a relatively low amount of known care and known control. An example of high confidence quality data is data that is entered into a server by the editorial staff of the company that owns the server. An example of low confidence quality data is data that is entered into a server by unaffiliated public users of the server.

Unfortunately, data on a conventional server is typically not organized according to the confidence quality of the data. Accordingly, when a query is sent to a conventional server for a search, the conventional server does not distinguish between high confidence quality data and low confidence quality. Thus, the search is likely to be inefficient because the conventional server may search all the data instead of focusing on the highest confidence quality data first.

What is needed is an improved method having features for addressing the problems mentioned above and new features not yet discussed. Broadly speaking, the inventive embodiments provided here fill these needs by providing a method and a system for structuring and searching data in a hierarchical confidence-based configuration. The inventive embodiments are described below.

In one embodiment, a method is provided for structuring data in hierarchical confidence-based configuration. The method comprises receiving data and assigning a confidence quality tier to the data. The confidence quality tier is in a range that spans from a highest confidence quality tier inclusive to a lowest confidence quality tier inclusive. Data of a particular confidence quality tier is configured to be searched preferably before data of a relatively lower confidence quality tier. The method further comprises organizing the data in a selected server of a server system according to the confidence quality tier. The selected server is in the range that spans from the highest confidence quality tier inclusive to the lowest confidence quality tier inclusive.

In a second embodiment, a method is provided for searching data in a hierarchical confidence-based configuration, the method comprises receiving a query into the server system. Data in the server system is organized from a highest confidence quality tier to a lowest confidence quality tier. Data of a particular confidence quality tier is configured to be searched preferably before data of a relatively lower confidence quality tier. The method further comprises searching data of the highest confidence quality tier in an attempt to satisfy the query. Searching the data of the highest confidence quality tier is performed before searching data of a lower confidence quality tier.

In a third embodiment, a system is provided for structuring data in a hierarchical confidence-based configuration. The system is configured for receiving data and assigning a confidence quality tier to the data. The confidence quality tier is in a range that spans from a highest confidence quality tier inclusive to a lowest confidence quality tier inclusive. Data of a particular confidence quality tier is configured to be searched preferably before data of a relatively lower confidence quality tier. The method is further configured for organizing the data in a selected server of a server system according to the confidence quality tier. The selected server is in the range that spans from the highest confidence quality tier inclusive to the lowest confidence quality tier inclusive.

In a fourth embodiment, a system is provided for searching data in a hierarchical confidence-based configuration. The system is configured for receiving a query into the server system. Data in the server system is organized from a highest confidence quality tier to a lowest confidence quality tier. Data of a particular confidence quality tier is configured to be searched preferably before data of a relatively lower confidence quality tier. The system is further configured for searching data of the highest confidence quality tier in an attempt to satisfy the query. Searching the data of the highest confidence quality tier is performed before searching data of a lower confidence quality tier.

A computer readable medium comprises one or more instructions for structuring data. The one or more instructions, when executed by one or more processors, cause the one or more processors to perform the steps of: receiving data; assigning a confidence quality tier to the data, wherein the confidence quality tier is in a range that spans from a highest confidence quality tier inclusive to a lowest confidence quality tier inclusive, and wherein data of a particular confidence quality tier is configured to be searched before data of a relatively lower confidence quality tier; and organizing the data in a selected server of a server system according to the confidence quality tier, wherein the selected server is in the range that spans from the highest confidence quality tier inclusive to the lowest confidence quality tier inclusive.

The disclosure encompasses other embodiments configured as set forth above and with other features and alternatives. It should be appreciated that these embodiments may be implemented in numerous ways, including as a method, a process, an apparatus, a system or a device.

BRIEF DESCRIPTION OF THE DRAWINGS

The inventive embodiments will be readily understood by the following detailed description in conjunction with the accompanying drawings. To facilitate this description, like reference numerals designate like structural elements.

DETAILED DESCRIPTION

Figure 1:
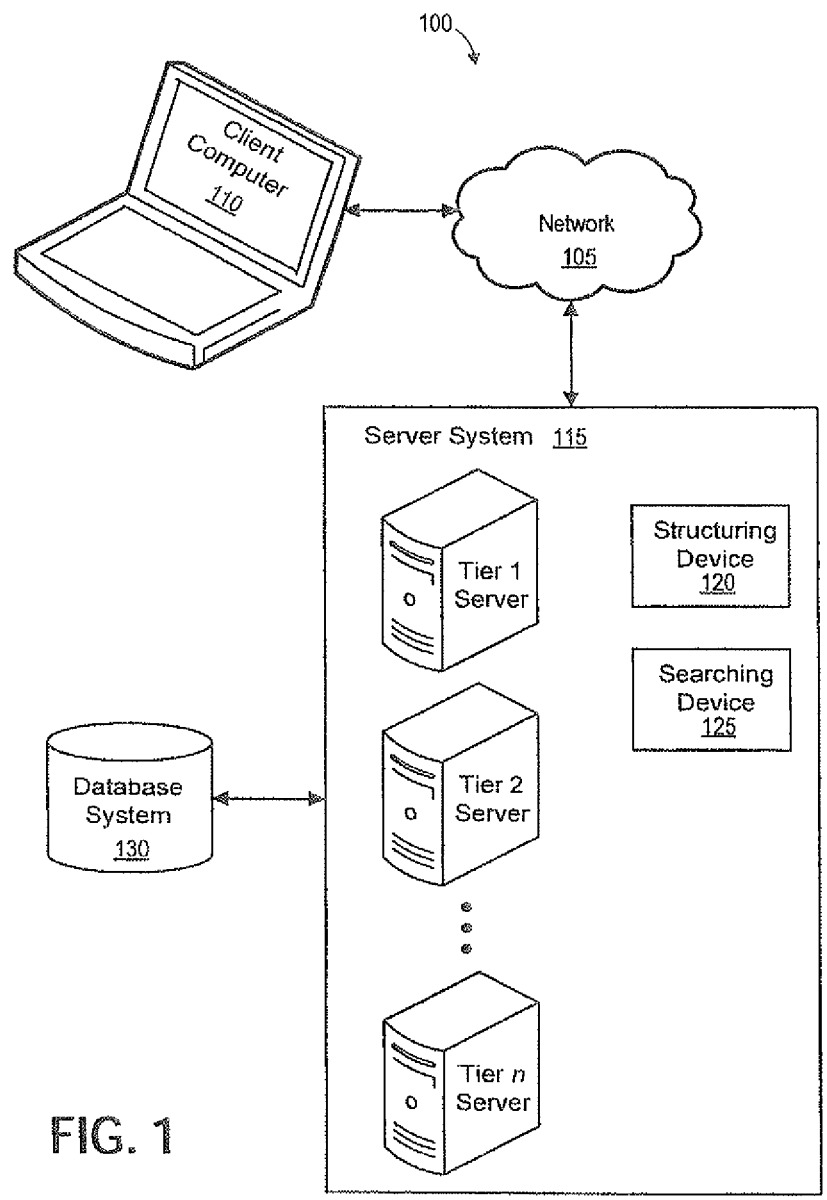
FIG. 1 is a block diagram of a system for structuring and searching data in a hierarchical confidence-based configuration, in accordance with some embodiments.

An embodiment is disclosed for a method and a system for structuring and searching data in a hierarchical confidence-based configuration. Numerous specific details are set forth in order to provide a thorough understanding of various embodiments. It will be understood, however, to one skilled in the art, that the embodiments may be practiced with other specific details.

DEFINITIONS

Some terms are defined below for clarity purposes. These terms are not rigidly restricted to these definitions. These terms and other terms may also be defined by their use in the context of this description.

"Computer" (e.g., "client computer" or "client" or "server") may refer to a single computer or to a system of interacting computers. A computer is a combination of a hardware system, a software operating system and perhaps one or more software application programs. Examples of a computer include without limitation a laptop computer, a palmtop computer, a smart phone, a cell phone, a mobile phone, an mp3 player, a digital audio recorder, a digital video recorder, a CD player, a DVD player, an IBM-type personal computer (PC) having an operating system such as Microsoft Windows®, an Apple® computer having an operating system such as MAC-OS, hardware having a JAVA-OS operating system, and a Sun Microsystems Workstation having a UNIX operating system.

"Confidence quality" means the minimum amount of known care and known control that has been used to enter data into a server and/or a database. An example of high confidence quality data is data that is manually entered into a server by the editorial staff of the company that owns the server. Such a company may be, for example, Macrovision®. An example of low confidence quality data is data that is entered into a server by unaffiliated public users of the server.

"Confidence quality tier" (e.g., "tier") means the confidence quality level that is associated with data of a particular confidence quality. A server and/or database may be referred to as being within a particular confidence quality tier when the associated data has a particular confidence quality.

"Database" means a collection of data organized in such a way that a computer program may quickly select desired pieces of the data. A database is an electronic filing system. In some instances, the term "database" is used as shorthand for "database management system".

"Device" means hardware, software or a combination thereof. A device may sometimes be referred to as an apparatus. Each device is configured to carry out one or more steps of the methods of structuring and searching data in a hierarchical confidence-based configuration.

"Fingerprint" (e.g., "audio fingerprint" or "acoustic fingerprint") is a digital measure of certain acoustic properties that is deterministically generated from an audio signal that can be used to identify an audio sample and/or quickly locate similar items in an audio database. "Fingerprinting" is the process of generating a fingerprint. Practical uses of audio fingerprinting include identifying songs, records, melodies, tunes, or advertisements; radio broadcast and peer to peer network monitoring; sound effect library management; video file identification; and much more. A fingerprint is an independent piece of data that is not affected by metadata. The company Macrovision® has databases that store over 25 million unique fingerprints for various audio samples. U.S. Pat. No. 7,277,766 (the '766 patent), which is hereby incorporated by reference, entitled "Method and System for Analyzing Digital Audio Files", provides an example of an apparatus for fingerprinting an audio waveform. U.S. Pat. No. 7,451,078 (the '078 patent), which is hereby incorporated by reference, entitled "Methods and Apparatus for Identifying Media Objects", provides an example of an apparatus for generating an audio fingerprint of an audio recording.

"Fuzzy search" (e.g., "fuzzy string search" or "approximate string search") means a search for text strings that approximately or substantially match a given text string pattern. Fuzzy searching may also be known as approximate or inexact matching. An exact match may occur while performing a fuzzy search.

"Metadata" generally means data that describes data. More particularly, metadata means data that describes the contents of a digital audio recording. Such metadata may include, for example, song name, artist information (e.g., name, birth date, discography, etc.), album information (e.g., album title, review, track listing, sound samples, etc.), relational information (e.g., similar artists and albums, genre, etc.), and other types of supplemental information. Conventional optical discs (e.g., CDs, DVDs and Blu-ray Discs) do not typically contain metadata. Metadata may be attached to a digital recording (e.g., song, album, movie or video) after the digital recording has been ripped from an optical disc, converted to another digital audio format and stored on a hard drive.

"Network" means a connection between any two or more computers, which permits the transmission of data. A network may be any combination of networks, including without limitation the Internet, a local area network, a wide area network, a wireless network and a cellular network.

"Server" means a software application that provides services to other computer programs (and their users), in the same or other computer. A server may also refer to the physical computer that has been set aside to run a specific server application. For example, when the software Apache HTTP Server is used as the web server for a company's website, the computer running Apache is also called the web server. Server applications can be divided among server computers over an extreme range, depending upon the workload.

"Table of Contents" (TOC) means the list of tracks (or chapters), the track (or chapter) start times and end times on an optical disc, such as a Blu-ray Disc, a CD or a DVD. The track start times on a disc are typically expressed as six-digit hexadecimal values. U.S. Pat. No. 7,359,900 (the '900 patent), which is hereby incorporated by reference, entitled "Digital Audio Track Set Recognition System", provides an example of a method of using TOC data to identify a CD or DVD. The '900 patent also describes a method of using the identification of a disc to lookup metadata in a database and then sending that metadata to an end user.

"Track" means an audio data block on an optical disc, such as a CD. A track stores at least a portion of an audio recording.

"Web browser" means any software application which can display text, graphics, or both, from Web pages on Web sites. Examples of a Web browser include without limitation Mozilla Firefox® and Microsoft Internet Explorer®.

"Web page" means any documents written in mark-up language including without limitation HTML (hypertext mark-up language) or VRML (virtual reality modeling language), dynamic HTML, XML (extended mark-up language) or related computer languages thereof, as well as to any collection of such documents reachable through one specific Internet address or at one specific Web site, or any document obtainable through a particular URL (Uniform Resource Locator).

"Web server" refers to an application, computer or other electronic device which is capable of serving at least one Web page to a Web browser. An example of a Web server is an Apache Web server.

"Web site" means at least one Web page, and more commonly a plurality of Web pages, virtually connected to form a coherent group.

For the implementations of the present system, a software application could be written in substantially any suitable programming language, which could easily be selected by one of ordinary skill in the art. The programming language chosen should be compatible with the computer by which the software application is to be executed and, in particular, with the operating system of that computer. Examples of suitable programming languages include without limitation Object Pascal, C, C++, Java and JavaScript. Further, the functions of some embodiments, when described as a series of steps for a method, could be implemented as a series of software instructions for being operated by a processor, such that the embodiments could be implemented as software, hardware, or a combination thereof. Computer readable media are discussed in more detail in a separate section below.

Structuring and Searching Data on a Server System

FIG. 1 is a block diagram of a system 100 for structuring and searching data in a hierarchical confidence-based configuration, in accordance with some embodiments. A network 105 couples together a client computer 110 and a server system 115. The network 105 may also be coupled to other client computers (not shown). The server system 115 is coupled to (or includes) a database system 130.

The server system 115 includes multiple servers, ranging from a tier 1 server to a tier n server. All servers of the server system 115 may collectively be coupled to the database system 130. Alternatively, each server of the server system 115 may each be coupled individually to its own database. The server system 115 may store and/or have access to digital media data collected and/or generated from one or more client computers 110. For example, the server system 115 may store and/or have access to fingerprints and associated metadata.

The server system 115 includes a structuring device 120 and a searching device 125. The structuring device 120 and the searching device 125 carry out the more important operations of the system 100. The components of the server system 115 are connected in such a way that enables the server system 115 to structure data and carry out searches for the client computer 110.

The client computer 110 of FIG. 1 includes hardware and/or software configured for communicating with the server system 115 to search a hierarchical confidence-based configuration of the server system 115. For example, the client computer 110 may have an operating system with a graphical user interface (GUI) to access the Internet and is preferably equipped with World Wide Web (Web) browser software, such as Mozilla Firefox®, operable to read and send Hypertext Markup Language (HTML) forms from and to a Hypertext Transport Protocol (HTTP) server on the Web. A standalone disc player (e.g., CD player, DVD player or Bluray Disc player) may have a built-in interface that enables the disc player to communicate with the server system 115 over the network 105, either directly or through another computer. For example, a CD player may have a data interface (e.g., an IDE interface or a USB interface) that enables the CD player to send and receive data from a laptop computer, which in turn is coupled to the network 105.

Likewise, the server system 115 includes hardware and/or software for communicating with the client computer 110. For example, the server system 115 may have HTTP compliant software, an operating system and common gateway interface (CGI) software for interfacing with the client computer 110 over the network 105. Alternatively, the server system 115 and client computer 110 may run proprietary software that enables them to communicate over the network 105.

It will be readily appreciated that the configuration in the block diagram of FIG. 1 is for explanatory purposes, and that numerous variations are possible. For example, the server system 115 may be coupled to a local area network (LAN), which in turn may be coupled to the network 105. In another example, the server system 115 may be coupled to multiple Web servers. The system 100 may also include a database system arranged in a different configuration than the database system 130 depicted here. For example, a hybrid configuration is discussed below with reference to FIGS. 1-4 in the next section.

Figure 2:
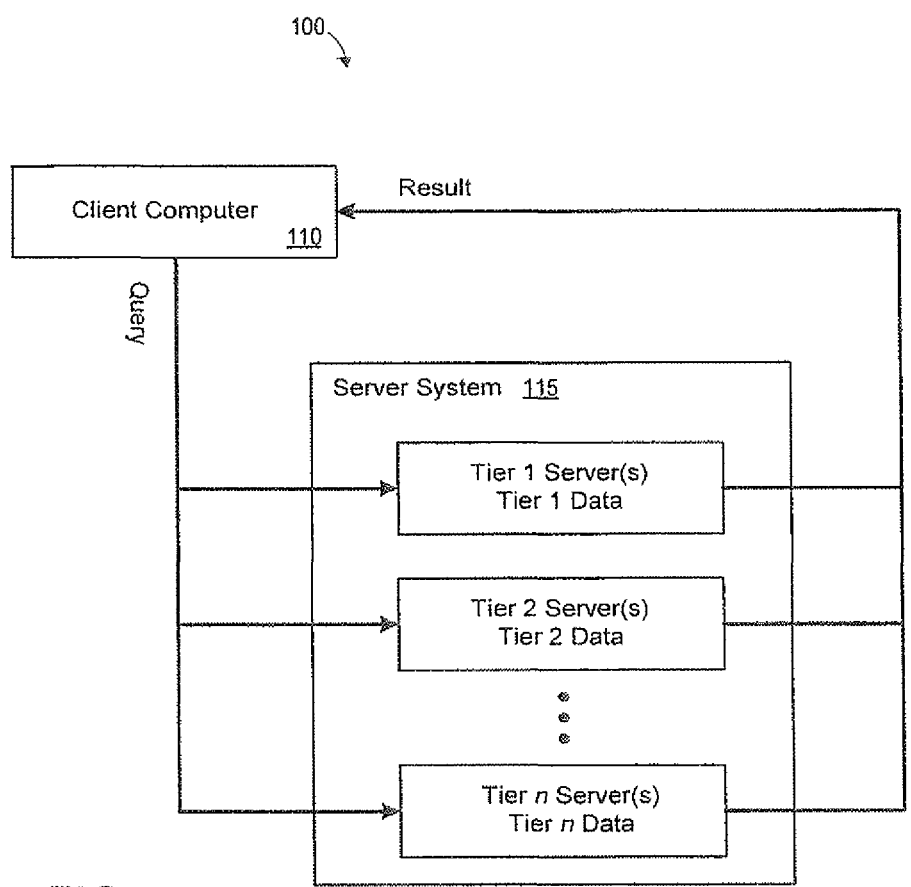
FIG. 2 is a schematic diagram of the system of FIG. 1 for structuring and searching data in a hierarchical confidence-based configuration, in accordance with some embodiments.

FIG. 2 is a schematic diagram of the system 100 of FIG. 1 for structuring and searching data in a hierarchical confidence-based configuration, in accordance with some embodiments. The system 100 is structured to optimize a fuzzy search initiated from a client computer 110. A fuzzy search means searching for strings that approximately or substantially match a given pattern string.

Before a search takes place, the structuring device 120 of FIG. 1 is configured to categorize data in the server system 115 based on the confidence quality. Confidence quality means the minimum amount of known care and known control that has been put into storing data into a server and/or a database. The highest confidence quality data provides the highest confidence results for a query. The lowest confidence quality data provides the lowest confidence results for a query.

The structuring device 120 is configured to break down the data and distribute the data across the multiple servers from highest confidence quality to lowest confidence quality. The structuring device 120 structures the data into tiered servers, from a tier 1 server to a tier n server, where n is a positive integer. For example, the tier 1 data is contained in the tier 1 server(s). The tier 2 data is contained in the tier 2 server(s), and so on.

The data is tiered as necessary into n server(s). Tier 1 data is the highest confidence quality data. An example of tier 1 data may be editorial data that is manually entered into the server system 115 by the editorial staff of the company that owns the server system 115. Such a company may be, for example, Macrovision®. Tier 2 is the next highest confidence quality data. An example of tier 2 data may be data submitted from partners of the company that owns the server system 115. The tiers of data continue in lesser confidence quality as necessary. Examples of lesser confidence quality data include the following: data that is mined from unaffiliated public users of the server system 115; and/or data that is entered by unaffiliated public users of the server system 115.

The searching device 125 of FIG. 1 is configured to search the tier 1 data first. The searching device 125 attempts to satisfy the query by searching the tier 1 data. If the tier 1 server returns a result to the query, then there is no need for the searching device 125 to aggregate all of the results from all of the servers in the server system 115. However, if the tier 1 server does not return a result to the query, then the searching device 125 moves on and preferably searches the tier 2 data next. The tier 2 server attempts to satisfy the query from the tier 2 data. If the tier 2 server returns a result to the query, there is no need for the searching device 125 to aggregate all of the results from all of the servers in the server system 115. The process continues as necessary to the tier n data in the tier n server(s).

It is important to note that the structuring device 120 is configured to organize data without regard to the likelihood of finding a match to a query. In many searches, the source that is least likely to find a query match may turn out to be the tier 1 data. Nevertheless, this confidence-based approach may improve searching efficiency in at least two ways. First, the searching device 125 may find the result immediately and not need to look through all of the data. Second, by finding and returning the highest confidence quality data first, the results do not need to be sorted for priority before being returned to the client computer 110. The data is already sorted by confidence quality before a search is performed. So, sorting for priority after a result is found is unnecessary.

Accordingly, the client computer 110 may access the server system 115 over the network 105. The client computer 110 may, for example, send a query for metadata associated with a recognized unique identifier in the server system 115. Each unique identifier in the server system 115 may have been generated, for example, from a table of contents (TOC) of a CD. Alternatively, each unique identifier may be, for example, a fingerprint generated from a track. A fingerprint is a digital measure of certain acoustic properties that is deterministically generated from an audio signal that can be used to identify an audio sample and/or quickly locate similar items in a database. In another embodiment, the client computer 110 may use a web browser to issue a string query to the server system 115. Other examples of searching configurations exist as well.

Structuring and Searching Data on a Database System

Figure 3:
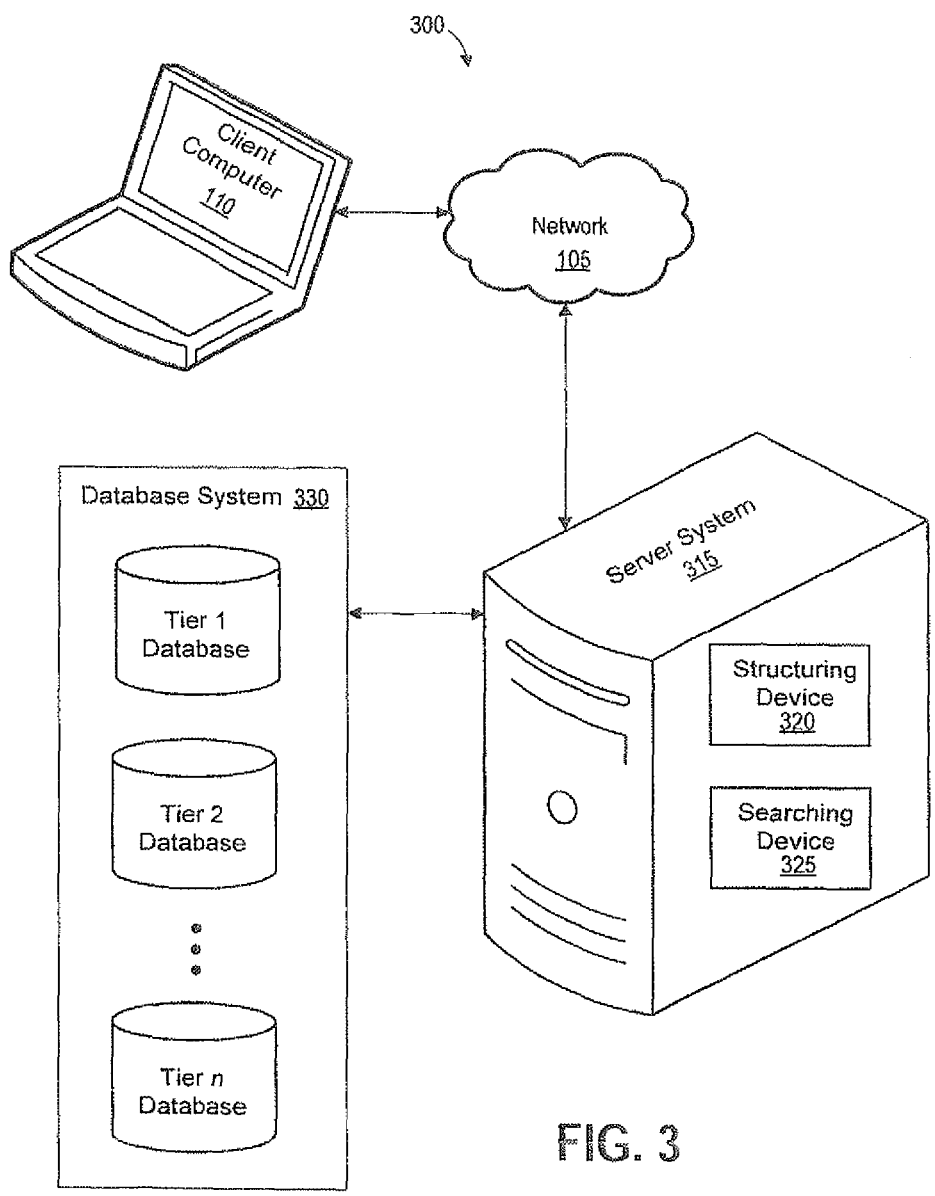
FIG. 3 is a block diagram of another system for structuring and searching data in a hierarchical confidence-based configuration, in accordance with some embodiments.

FIG. 3 is a block diagram of another system 300 for structuring and searching data in a hierarchical confidence-based configuration, in accordance with some embodiments. The system 300 of FIG. 3 is substantially the same as the system 100 of FIG. 1. However, in the system 300 of FIG. 3, the database system 330 is organized into tiers and the server system 315 includes preferably one server. A network 105 couples together a client computer 110 and a server system 315. The network 105 may also be coupled to other client computers (not shown). The server system 115 is coupled to a database system 330.

The database system 330 includes multiple databases, ranging from a tier 1 database to a tier n database. All databases of the database system 330 may collectively be coupled to the server system 315. The database system 330 may store digital media data collected and/or generated from one or more client computers 310. For example, the database system 330 may store fingerprints and associated metadata.

The server system 315 includes a structuring device 320 and a searching device 325. The structuring device 320 and the searching device 325 carry out the more important operations of the system 300. The components of the server system 315 are connected in such a way that enables the server system 315 to structure data and carry out searches for the client computer 110.

The client computer 110 of FIG. 3 includes hardware and/or software configured for communicating with the server system 315 to search a hierarchical confidence-based configuration of the database system 330. For example, the client computer 110 may have an operating system with a graphical user interface (GUI) to access the Internet and is preferably equipped with World Wide Web (Web) browser software, such as Mozilla Firefox®, operable to read and send Hypertext Markup Language (HTML) forms from and to a Hypertext Transport Protocol (HTTP) server on the Web. A standalone disc player (e.g., CD player, DVD player or Bluray Disc player) may have a built-in interface that enables the disc player to communicate with the database system 330 over the network 105, either directly or through another computer. For example, a CD player may have a data interface (e.g., an IDE interface or a USB interface) that enables the CD player to send and receive data from a laptop computer, which in turn is coupled to the network 105.

Likewise, the server system 315 includes hardware and/or software for communicating with the client computer 110. For example, the server system 315 may have HTTP compliant software, an operating system and common gateway interface (CGI) software for interfacing with the client computer 110 over the network 105. Alternatively, the server system 315 and client computer 110 may run proprietary software that enables them to communicate over the network 105.

It will be readily appreciated that the configuration in the block diagram of FIG. 3 is for explanatory purposes, and that numerous variations are possible. For example, the database system 330 may be coupled to a local area network (LAN), which in turn may be coupled to the network 105. In another example, the database system 330 may be coupled to multiple Web servers. The system 300 may also include a database system arranged in a different configuration than the database system 330 depicted here. For example, a hybrid configuration is discussed below with reference to FIGS. 1-4.

Figure 4:
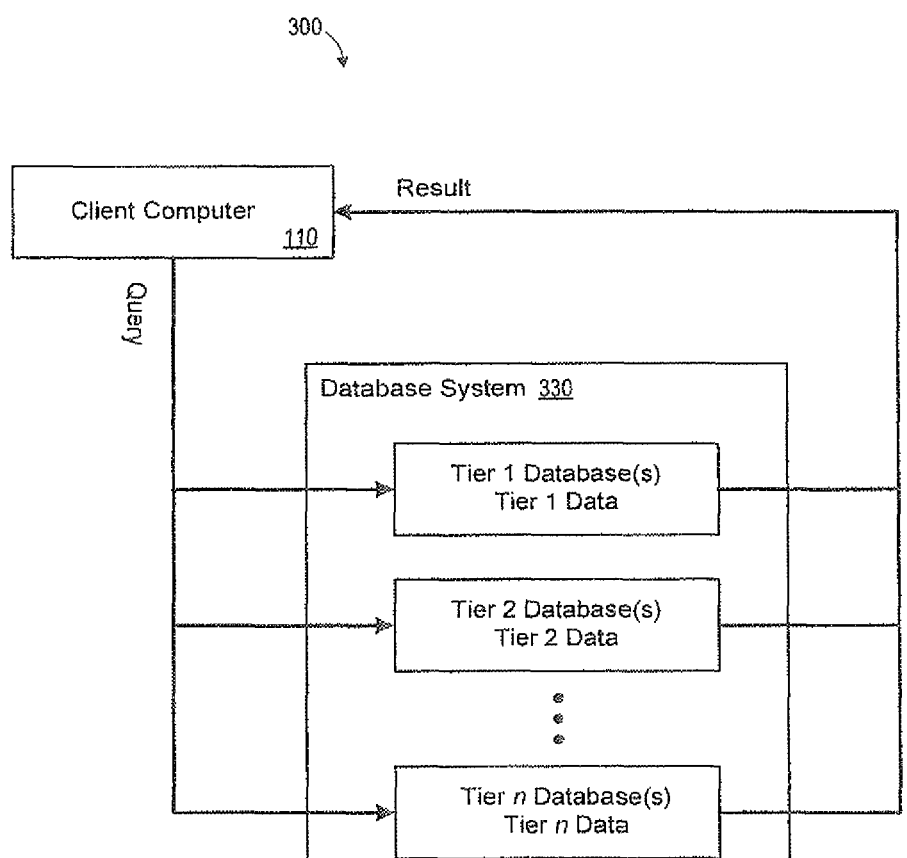
FIG. 4 is a schematic diagram of the system of FIG. 3 for structuring and searching data in a hierarchical confidence-based configuration, in accordance with some embodiments.

FIG. 4 is a schematic diagram of the system 300 of FIG. 3 for structuring and searching data in a hierarchical confidence-based configuration, in accordance with some embodiments. In an embodiment, the system 300 of FIG. 4 may be substantially similar to the system 100 of FIG. 2. However, in this system 300, the database system 330 is organized into tiers and the server system 315 has preferably one server. The system 300 is structured to optimize a fuzzy search initiated from a client computer 110. A fuzzy search means searching for strings that approximately or substantially match a given pattern string.

Before a search takes place, the structuring device 320 of FIG. 3 is configured to categorize data in the database system 315 based on the confidence quality. The highest confidence quality data provides the highest confidence results for a query. The lowest confidence quality data provides the lowest confidence results for a query. As mentioned above with reference to FIG. 1, confidence quality means the minimum amount of known care and known control that has been put into storing data into a server and/or a database.

The structuring device 320 is configured to break down the data and distribute the data across the multiple databases from highest confidence quality to lowest confidence quality. The structuring device 320 structures the data into tiered databases, from a tier 1 database to a tier n database, where n is a positive integer. For example, the tier 1 data is contained in the tier 1 database(s). The tier 2 data is contained in the tier 2 database(s), and so on.

The data is tiered as necessary into n database(s). Tier 1 data is the highest confidence quality data. An example of tier 1 data is editorial data that is manually entered into the database system 315 by the editorial staff of the company that owns the database system 315. Such a company may be, for example, Macrovision®. Tier 2 is the next highest confidence quality data. An example of tier 2 data is data submitted from partners of the company that owns the database system 315. The tiers of data continue in lesser confidence quality as necessary. Examples of lesser confidence quality data include the following: data that is mined from unaffiliated public users of the database system 315; and/or data that is entered by unaffiliated public users of the database system 315.

The searching device 325 of FIG. 3 is configured to search the tier 1 data first. The searching device 325 attempts to satisfy the query from the tier 1 data. If the tier 1 database returns a result to the query, there is no need for the searching device 325 to aggregate all of the results from all of the databases in the database system 330. However, if the tier 1 database does not have a result to the query, then the searching device 325 moves on and preferably searches the tier 2 data next. The tier 2 database may satisfy the query from the tier 2 data. If the tier 2 database has a result to the query, there is no need for the searching device 325 to aggregate all of the results from all of the databases in the database system 330. The process continues as necessary to the tier n data in the tier n database(s).

It is important to note that the structuring device 320 is configured to organize data without regard to the likelihood of finding a match to a query. In many searches, the source that is least likely to find a query match may turn out to be the tier 1 data. Nevertheless, this confidence-based approach may improve searching efficiency in at least two ways. First, the searching device 325 may find the result immediately and not need to look through all of the data. Second, by finding and returning the highest confidence quality data first, the results do not need to be sorted for priority before being returned to the client computer 110. For example, the data is already sorted by confidence quality before a search is performed. So, sorting for priority after a result is found is unnecessary.

Accordingly, the client computer 110 may access the database system 330 over the network 105. The client computer 110 may, for example, send a query for metadata associated with a recognized unique identifier in the database system 330. Each unique identifier in the database system 330 may have been generated, for example, from a table of contents (TOC) of a CD. Alternatively, each unique identifier may be, for example, a fingerprint generated from a track. A fingerprint is a digital measure of certain acoustic properties that is deterministically generated from an audio signal that can be used to identify an audio sample and/or quickly locate similar items in a database. In another embodiment, the client computer 110 may use a web browser to issue a string query to the database system 330. Other examples of searching configurations exist as well.

Referring to FIGS. 1-4, note that some embodiments may include a hybrid of the embodiments discussed above. For example, a server system may include multiple servers, while at least one server in the server system is coupled to multiple databases. The multiple servers and multiple databases may be tiered in a predetermined manner according to confidence quality tiers. Likewise, the data may be structured according to confidence quality tiers across the multiple servers and multiple databases. Other variations exist as well.

Method Overview

Figure 5:
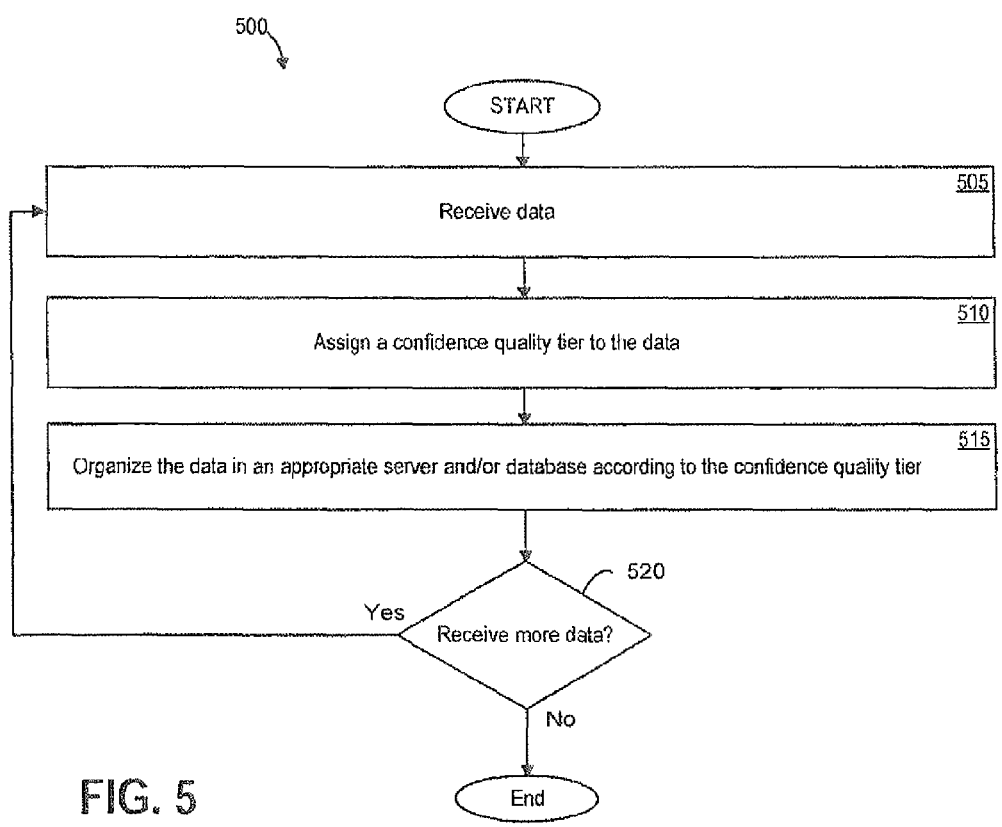
FIG. 5 is a flowchart of a method for structuring data in a hierarchical confidence-based configuration, in accordance with some embodiments.

FIG. 5 is a flowchart of a method 500 for structuring data in a hierarchical confidence-based configuration, in accordance with some embodiments. In some implementations, the steps of the method 500 may be carried out by the structuring device 120 of FIG. 1.

The method 500 starts in a step 505 where the system receives data. The method 500 then moves to a step 510 where the system assigns a confidence quality tier to the data. The confidence quality tier is in a range that spans from a highest confidence quality tier inclusive to a lowest confidence quality tier inclusive. Preferably, the system predetermines the confidence quality tiers for the data in the servers and/or databases. For example, the system may predetermine the confidence quality tiers to include a highest confidence quality tier, a lowest confidence quality tier and one or more intermediate confidence quality tiers. Data of a particular confidence quality tier is configured to be searched preferably before data of a relatively lower confidence quality tier. Accordingly, in a step 515, the system organizes the data in a selected server according to the confidence quality tier. The selected server is in the range that spans from the highest confidence quality tier inclusive to the lowest confidence quality tier inclusive.

The method then proceeds to a decision operation 520 where the system determines whether more data is to be received. For example, an editor of the server system may be manually entering more data. If more data is to be received, then the method 500 returns to the step 505 where the system receives data. The method 500 continues from there. However, if the system determines that more data is not to be received at the decision operation 520, then the method 500 concludes after the decision operation 520.

Figure 6:
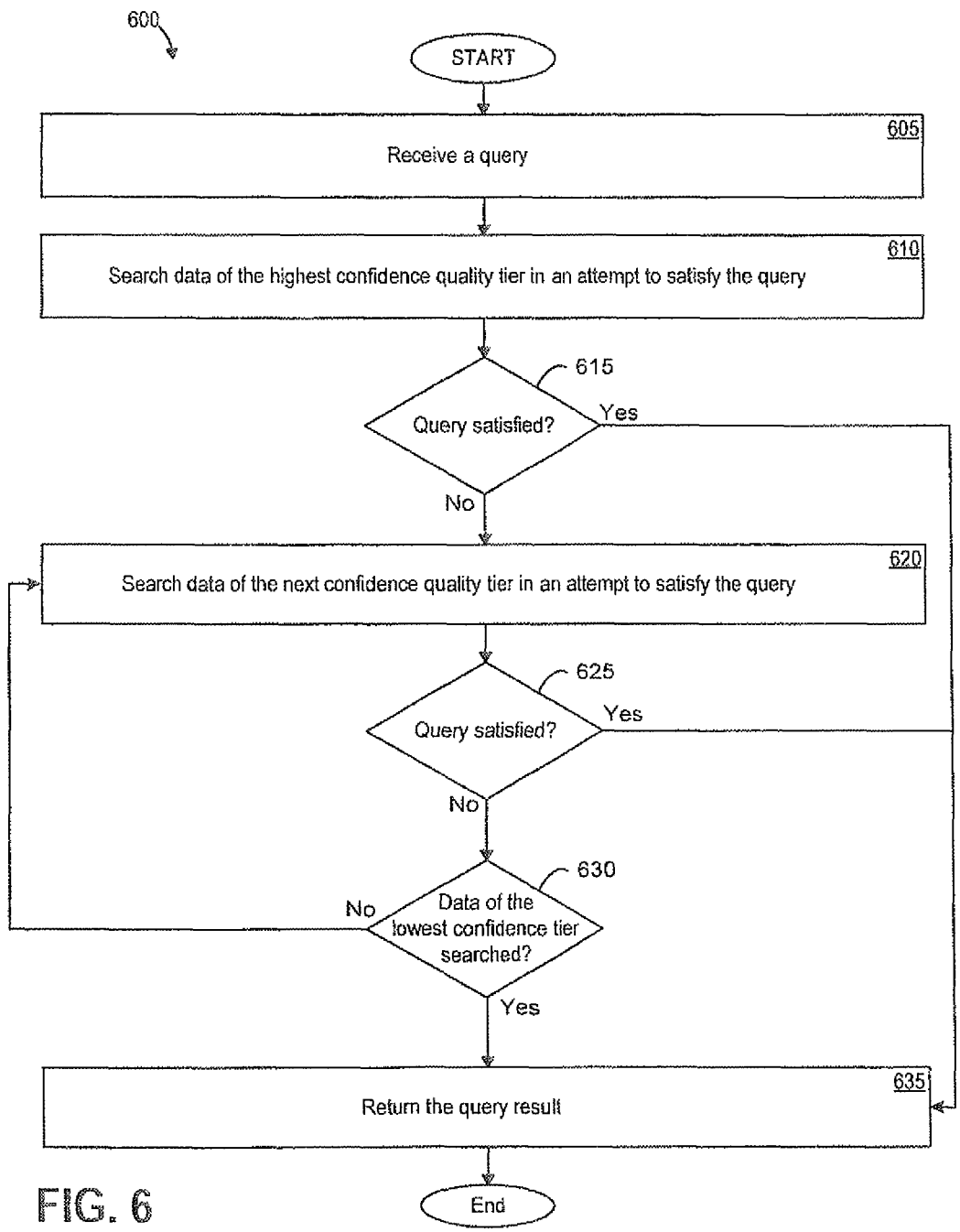
FIG. 6 is a flowchart of a method for searching data in a hierarchical confidence-based configuration, in accordance with some embodiments.

FIG. 6 is a flowchart of a method 600 for searching data in a hierarchical confidence-based configuration, in accordance with some embodiments. In some implementations, the steps of the method 600 may be carried out by the searching device 125 of FIG. 1.

The method starts in a step 605 where the system receives a query from a client computer into a server system. Data in the server system is organized from a highest confidence quality tier inclusive to a lowest confidence quality tier inclusive. Some embodiments use the method 500 of FIG. 5 to organize the data in the servers and/or databases before the search takes place. As discussed above with reference to FIG. 5, the system preferably predetermines the confidence quality tiers for the servers and/or databases. For example, the system may predetermine the confidence quality tiers to include a highest confidence quality tier, a lowest confidence quality tier and one or more intermediate confidence quality tiers. Data of a particular confidence quality tier is configured to be searched preferably before data of a relatively lower confidence quality tier. Accordingly, in a step 610, the system begins the search by searching data of the highest confidence quality tier in an attempt to satisfy the query.

Next, in a decision operation 615, the system determines if the query is satisfied by any data in the highest confidence quality tier. If the query is satisfied, then the method 600 moves to a step 635 where the system returns the query result to the client computer. However, if the system determines that the query is not satisfied at the decision operation 615, then the method proceeds to a step 620 where the system searches data of the next confidence quality tier in an attempt to satisfy the query. Preferably, the data searched at this step 620 has a lower confidence quality than the data searched at the step 610 above.

Next, in a decision operation 625, the system determines if the query is satisfied by any data in the confidence quality tier searched at the step 620 above. If the query is satisfied, then the method 600 moves to the step 635 where the system returns the query result to the client computer. However, if the system determines that the query is not satisfied in the decision operation 625, then the method 600 proceeds to a decision operation 630.

In the decision operation 630, the system determines if data of the lowest confidence quality tier has been searched. If data of the lowest confidence quality tier has not been searched, then the method 600 returns to the step 620 where the system searches data of the next confidence quality tier. Preferably, the data searched at this step 620 has a lower confidence quality than data previously searched. The method 600 continues from the step 620, until a result is found or all the confidence quality tiers are searched.

In the decision operation 630, if the system determines that data of the lowest confidence quality tier has been searched, then the method 600 moves to the step 635 where the system returns the query result to the client computer that sent the query. It is possible, at the step 635, that the query result may be that the system was unable to find a match for the query. After the step 635, the method 600 concludes.

Note that these methods may include other details and steps that are not discussed in this method overview. Other details and steps are discussed above with reference to the appropriate figures and may be a part of the methods, depending on the embodiment.

Computer Readable Medium Implementation

Portions of some embodiments may be conveniently implemented by using a conventional general purpose or a specialized digital computer or microprocessor programmed according to the teachings of the present disclosure, as will be apparent to those skilled in the computer art. Appropriate software coding can readily be prepared by skilled programmers based on the teachings of the present disclosure. The methods and systems may also be implemented by the preparation of application-specific integrated circuits or by interconnecting an appropriate network of conventional component circuits.

An implementation may include a computer program product which is a storage medium (media) having instructions stored thereon/in which can be used to control, or cause, a computer to perform any of the processes of the implementation. The storage medium can include without limitation any type of disk including floppy disks, mini disks (MD's), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), some implementations include software for controlling both the hardware of the general purpose/specialized computer or microprocessor, and for enabling the computer or microprocessor to interact with a human user or other mechanism utilizing the results of the particular embodiment. Such software may include without limitation device drivers, operating systems, and user applications. Ultimately, such computer readable media further includes software for performing aspects of the methods and system, as described above.

Included in the programming (software) of the general/specialized computer or microprocessor are software modules for implementing the processes described above. The processes described above including without limitation the following: receiving data; assigning a confidence quality tier to the data, wherein the confidence quality tier is in a range that spans from a highest confidence quality tier inclusive to a lowest confidence quality tier inclusive, and wherein data of a particular confidence quality tier is configured to be searched before data of a relatively lower confidence quality tier; and organizing the data in a selected server of a server system according to the confidence quality tier, wherein the selected server is in the range that spans from the highest confidence quality tier inclusive to the lowest confidence quality tier inclusive.

Advantages

Embodiments of the system allow structuring and searching of data on servers according to the confidence quality of the data. The system efficiently structures data across servers to improve responsiveness and decrease overall load. The system improves efficiency of searches in at least two ways. First, the system may find the result immediately and not need to look through all of the data. Second, by finding and returning the highest confidence quality data first, the results do not need to be sorted for priority before being returned to the client computer. The data is already sorted by confidence quality before a search is performed. So, sorting for priority after a result is found is unnecessary. The improvements provide users and customers with an improved experience while spending fewer costly server resources.

Specific embodiments are described in the specification. It will, however, be evident that various modifications and changes may be made thereto without departing from the broader spirit and scope. The specification and drawings are, accordingly, to be regarded in an illustrative rather than a restrictive sense.

What is claimed is:

1. A data structuring method performed by a server system, the method comprising:
    receiving data;
    assigning a confidence quality tier to the data, wherein the confidence quality tier is in a range that spans from a highest confidence quality tier inclusive to a lowest confidence quality tier inclusive, and wherein, data of a particular confidence quality tier is configured to be searched before data of a relatively lower confidence quality tier;
    organizing the data in a selected database of a database system according to the confidence quality tier, wherein the selected database is in the range that spans from the highest confidence quality tier inclusive to the lowest confidence quality tier inclusive;
    organizing databases of the database system according to confidence quality tiers of data associated with the databases; and
    arranging the databases from a tier 1 database to a tier n database, wherein n is a positive integer, and wherein the tier 1 database is in the highest confidence quality tier, and wherein the tier n database is in the lowest confidence quality tier.

2. The method of claim 1, wherein a confidence quality tier is a particular confidence quality level that is associated with data of a particular confidence quality, and wherein confidence quality is a minimum amount of known care and known control that has been used to enter data into a database of the database system.

3. The method of claim 1, wherein the database system is configured to be coupled to the server system, wherein the server system is configured for fuzzy searching, and wherein fuzzy searching is searching for strings that substantially match a given text string pattern, and wherein organizing the data optimizes fuzzy searching.

4. The method of claim 1, wherein organizing the data is performed without regard to a likelihood of finding as match to a query, wherein the data includes text strings and is organized without regard to the likelihood of finding a match to a query, and wherein the likelihood of finding a match to a query is a likelihood that a given text string substantially matches a given query text string pattern as a result of performing fuzzy searching.

5. A server system for structuring data, comprising:
at least one processor constructed to perform steps of:
receiving data;
assigning a confidence quality tier to the data, wherein the confidence quality tier is in a range that spans from a highest confidence quality tier inclusive to a lowest confidence quality tier inclusive, and wherein data of as particular confidence quality tier is configured to be searched before data of as relatively lower confidence quality tier;
organizing the data in a selected database of as database system according to the confidence quality tier, wherein the selected database is in the range that spans from the highest confidence quality tier inclusive to the lowest confidence quality tier inclusive;
organizing databases of the database system according to confidence quality tiers of data associated with the databases; and
arranging the databases from a tier 1 database to a tier n database, wherein n is a positive integer, and wherein the tier database is in the highest confidence quality tier, and wherein the tier n database is in the lowest confidence quality tier.

6. The system of claim 5, wherein a confidence quality tier is particular confidence quality level that is associated with data of a particular confidence quality, and wherein confidence quality is a minimum amount of known care and known control that has been used to enter data into a database of the database system.

7. The system of claim 5, wherein the database system is configured to be coupled to the server system, Wherein the server system is configured for fuzzy searching, wherein fuzzy searching is searching for strings that substantially match a given text string pattern, and wherein organizing the data optimizes fuzzy searching.

8. The system of claim 5, wherein organizing the data is performed without regard to a likelihood of finding a match to a query, wherein the data includes tent strings and is organized without regard to the likelihood of finding a match to a query, and wherein the likelihood of finding a match to a query is as likelihood that a given text string substantially matches as given query text string pattern as a result of performing fuzzy searching.

9. A non-transitory computer readable storage medium retrievably storing one or more instructions for structuring data, wherein the one or more instructions, when executed by one or more processors, cause the one or more processors to perform steps of:
receiving data;
assigning a confidence quality tier to the data, wherein the confidence quality tier is in a range that spans from a highest confidence quality tier inclusive to a lowest confidence quality tier inclusive, and
wherein data of a particular confidence quality tier is configured to be searched before data of a relatively lower confidence quality tier;
organizing the data in a selected database of a database system according to the confidence quality tier, wherein the selected database is in the range that spans from the highest confidence quality tier inclusive to the lowest confidence quality tier inclusive;
organizing databases of the database system according to confidence quality tiers of data associated with the databases; and
arranging the databases from a tier 1 database to a tier n database, wherein n is a positive integer, and wherein the tier 1 database is in the highest confidence quality tier, and wherein the tier n database is in the lowest confidence quality tier.

10. The computer readable storage medium claim 9, wherein organizing the data is performed without regard to a likelihood of finding a match to a query, wherein the data includes text strings and is organized without regard to the likelihood of finding a match to a query, and wherein the likelihood of finding a match to a query is a likelihood that to given text string substantially matches a given query text string pattern as a result of performing fuzzy searching.

* * * * *